Sept. 29, 1942.   K. P. MORSE   2,296,865
AUTOGRAPHIC REGISTER
Filed Aug. 8, 1940   3 Sheets-Sheet 1
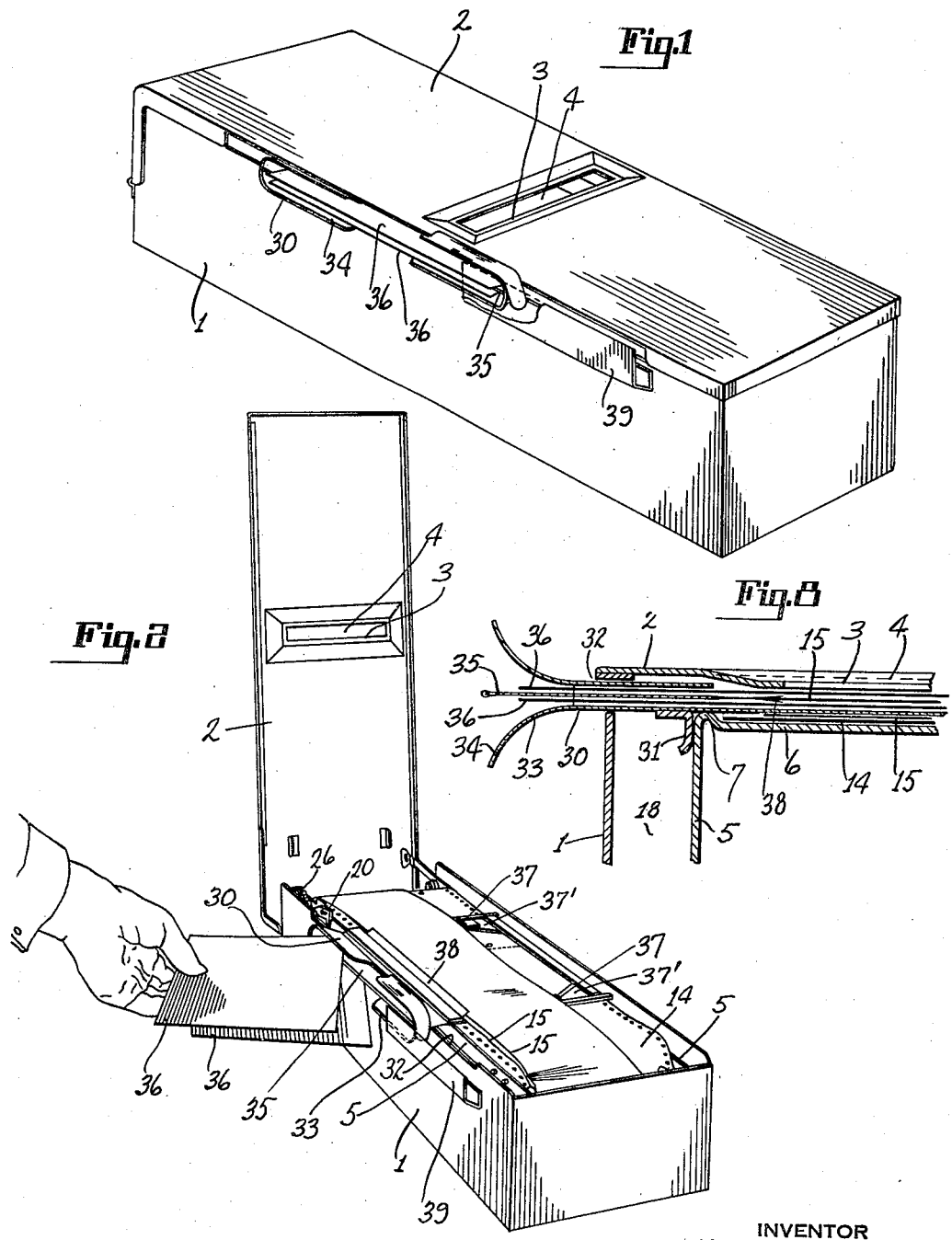
INVENTOR
KENNETH P. MORSE
BY
*J. L. Walker*
ATTORNEY Sept. 29, 1942.    K. P. MORSE    2,296,865
AUTOGRAPHIC REGISTER
Filed Aug. 8, 1940    3 Sheets-Sheet 2
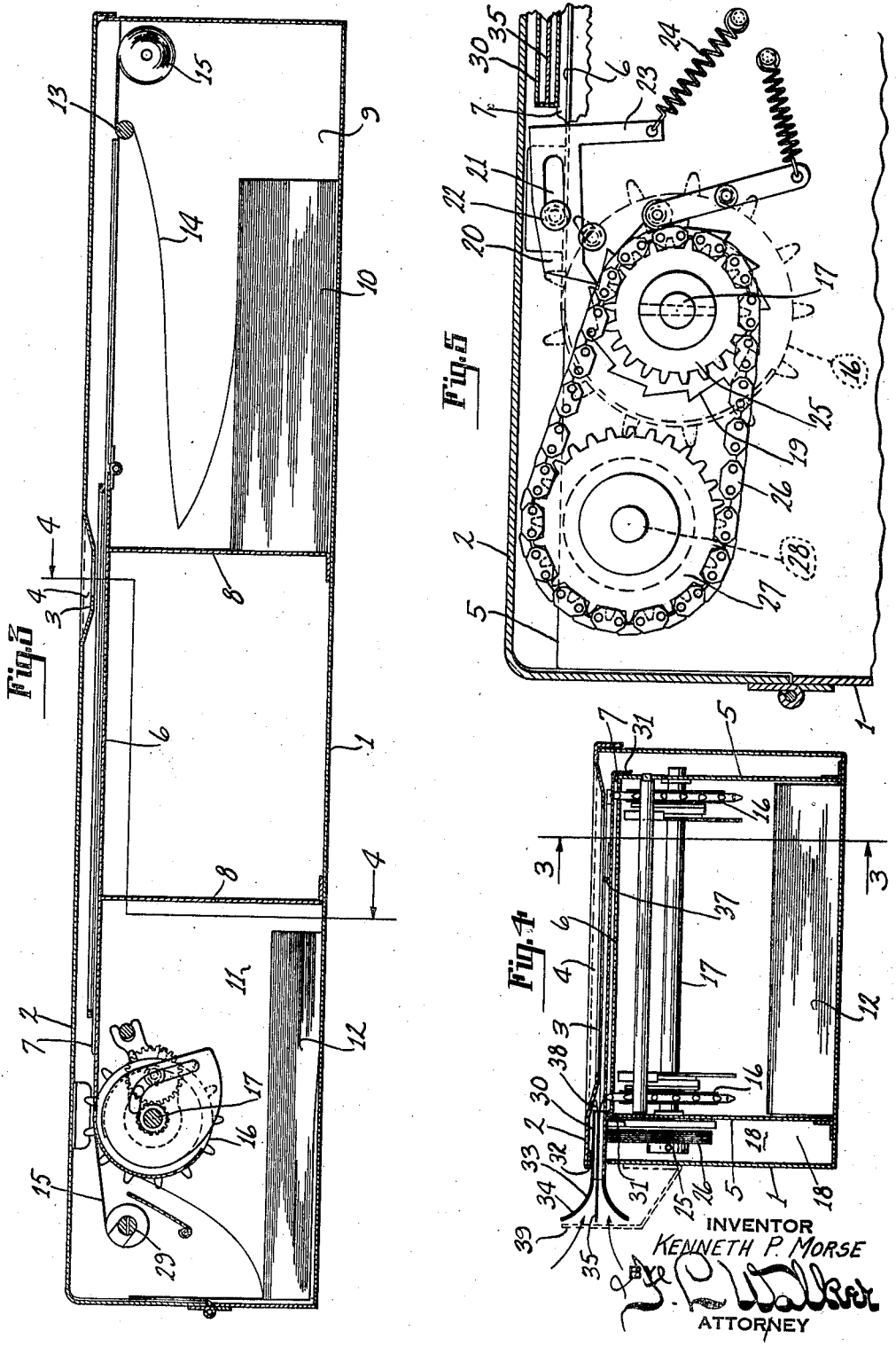
INVENTOR
KENNETH P. MORSE
ATTORNEY Sept. 29, 1942.  K. P. MORSE  2,296,865
AUTOGRAPHIC REGISTER
Filed Aug. 8, 1940  3 Sheets-Sheet 3
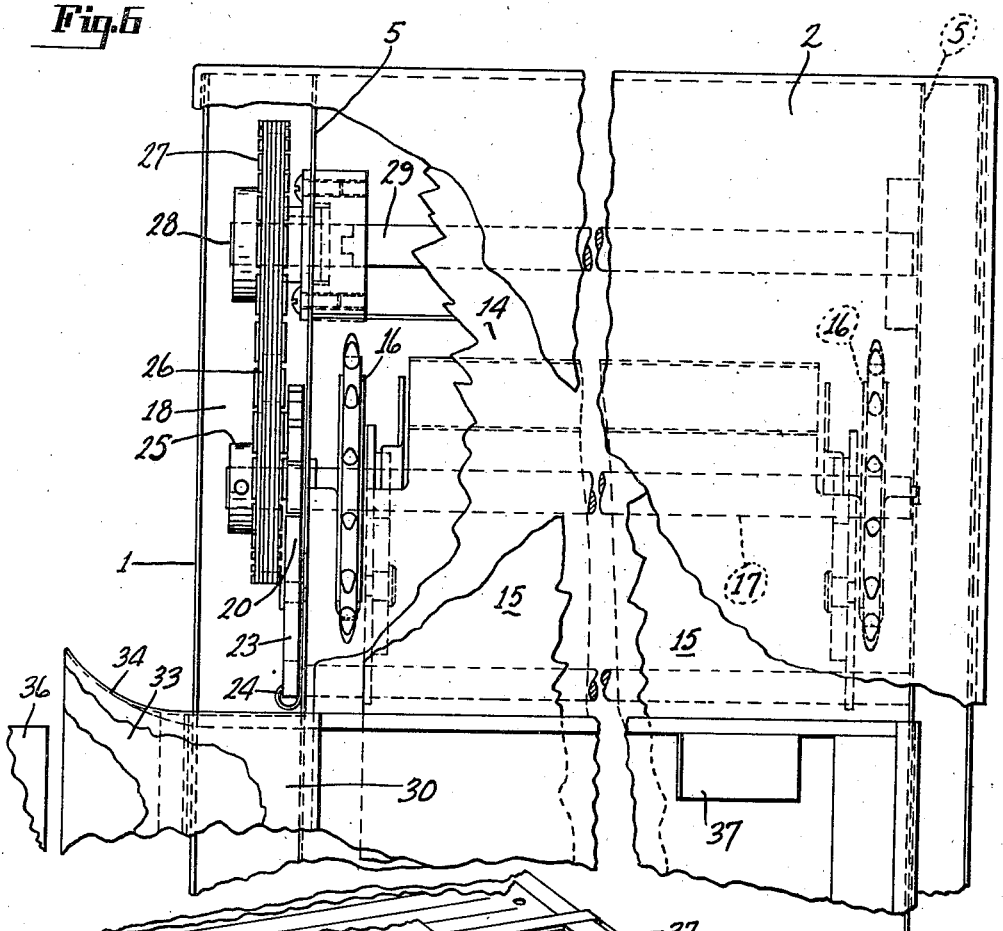
Fig.6
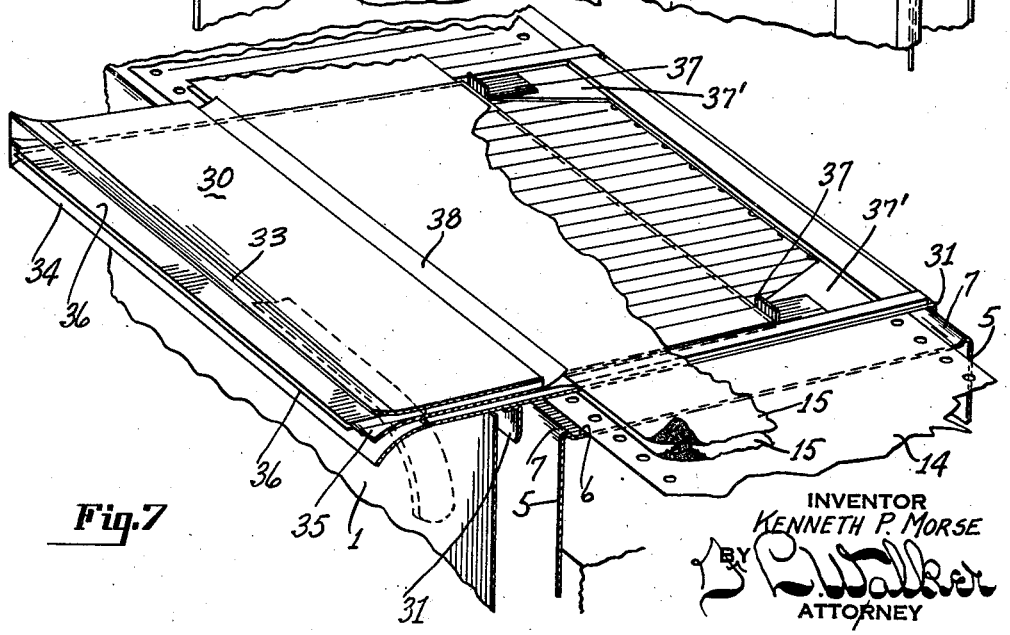
Fig.7
INVENTOR
KENNETH P. MORSE
ATTORNEY Patented Sept. 29, 1942

2,296,865

UNITED STATES PATENT OFFICE 2,296,865

AUTOGRAPHIC REGISTER

Kenneth P. Morse, Dayton, Ohio, assignor to The Standard Register Company, Dayton, Ohio, a corporation of Ohio Application August 8, 1940, Serial No. 351,878

18 Claims. (Cl. 282—5)

The invention pertains to autographic registers and more particularly to a combined card or sheet and strip record receiving apparatus.

The register is especially adapted for accounting purposes, wherein single entries are to be made from time to time on ledger or account cards, such as partial or installment payments or stock record cards. In installment accounting, it is customary for an individual customer's ledger or record card to be kept by the merchant and a like card to be kept by the customer, who when making payment presents his card for duplicate entry of that made on the master card or merchant's account record. It is highly desirable that a further detailed record be kept consecutively of the entries of different cards in the order in which they are made. Likewise, in stock accounting by a perpetual inventory system, the receipts and withdrawals of different kinds of merchandise may be recorded in duplicate on separate sets of cards, and an additional continuous record kept of all such receipts and withdrawals of stock.

In the present register provision is made for the simultaneous insertion of duplicate interchangeable record sheets or cards in superposed relation with each other and with a continuous record strip retained in the machine, and in alternative relation with transfer strips or ribbons interposed therebetween.

Whatever indicia entry is inscribed upon the uppermost removable card is reproduced upon the underlying card, and simultaneously reproduced upon the continuous record strip which remains in the register and is advanced one line or space at each operation preparatory to the succeeding record entry.

The object of the invention is to improve the construction as well as the means and mode of operation of autographic registers, whereby they may not only be economically manufactured, but will be more efficient in use, automatic in operation, uniform in action, having relatively few operating parts, and unlikely to get out of repair.

A further object of the invention is to provide an autographic register operable upon interchangeable cards or sheets and adapted to register duplicate inscribed indicia in identical positions upon different record receiving cards.

A further object of the invention is to provide a combined card and strip register wherein successively inscribed indicia produced upon different interchangeable record cards will be likewise produced in progressive succession upon a continuous record strip.

A further object of the invention is to provide a receiver for multiple interchangeable cards or sheets and enable the registry of successive spaces on the record cards with the inscribing position and with the succeeding record receiving space of the record strip.

A further object of the invention is to provide improved automatic feeding means for the record strip operated incident to the insertion and removal of interchangeable cards.

A further object of the invention is to provide in an autographic register a traveling sheet holder by which different record receiving areas may be registered one with another.

A further object of the invention is to provide an automatic strip feeding device.

A further object of the invention is to provide an autographic register embodying the advantageous structural features and having the inherent meritorious characteristics herein mentioned.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

In the drawings, wherein is illustrated the preferred but obviously not necessarily the only form of embodiment of the invention, Fig. 1 is a perspective view of an autographic register embodying the present invention, in closed position and ready for operation.

Fig. 2 is a perspective view of the assembled register when open, showing the interior arrangement of parts and the manner of inserting a pair of interchangeable record cards. It is to be understood that normally the cards are inserted while the register is in closed, operating condition, as shown in Fig. 1.

Fig. 3 is a longitudinal sectional view of the assembled register on line 3—3 of Fig. 4, illustrating the relation of the strip supply and receiving compartments, the record and carbon strip feeding means and the record card carriage.

Fig. 4 is a transverse sectional view of the assembled register on line 4—4 of Fig. 3.

Fig. 5 is a detail side elevation of the strip feeding and carbon material retrieving mechanism.

Fig. 6 is an enlarged plan view partly broken away of the forward portion of the cabinet containing the strip feeding and carbon retrieving mechanism.

Fig. 7 is an enlarged perspective view of the card receiving carriage and contiguous portions of the cabinet.

Fig. 8 is an enlarged detail view.

Like parts are indicated by similar characters of reference throughout the several views.

The present register includes a box-like cabinet 1, having a lid or cover 2 provided at midlength with an apertured depression 3, the opening 4 of which defines the record inscribing position, beneath which prescribed record receiving areas of the record cards and strip are presented in registry with the opening 4.

Located within the cabinet 1 in spaced relation with the side walls thereof is an inverted channel shaped housing comprising side walls 5—5 and a slightly depressed top 6, which forms a strip guide for the record strip and that portion immediately beneath the opening 4 of the cabinet lid affords a writing tablet.

The slightly elevated, rounded margins of the top 6 afford tracks 7 for a reciprocatory card holder. The interior of the inverted housing is divided by transverse walls 8 into a rearward supply compartment 9 for a packet 10 of zigzag folded record strip material, and a forward compartment 11 into which the inscribed portion of the record strip is refolded into the packet 12.

The top 6 of the housing terminates in spaced relation with the ends of the cabinet 1 to afford access openings for insertion and removal of the respective packets.

In the supply compartment 9 at the extremity of the guide top 6 is a transverse guide rod or roller 13, about which the record strip 14 is drawn from the packet 10. Also located in the supply compartment is a supply roll of carbon or transfer material 15, preferably but not necessarily comprising plural strips interrolled together.

To insure uniform advancement of the record strip and its arrest with prescribed areas accurately presented in record receiving position, the strip is provided with longitudinally spaced feed holes for engagement of a pin type feeding device. The record strip 14 and carbon material 15 extend over the guide top 6 with plural strips of carbon superposed upon the records strip. At its forward end, the register is provided with a pair of pin wheels 16 mounted on a transverse shaft 17 having engagement in the feed holes in the strip, beyond which the advanced portion of the strip is deposited in the forward compartment 11.

In a lateral space 18 between the interior frame or housing wall 5 and the side of the cabinet 1, the pin wheel shaft carries a ratchet wheel 19 engaged by a reciprocatory actuating pawl 20. The pawl 20 is slotted at 21 and mounted on a stud 22 on the wall 5, for both reciprocatory and oscillatory motion. It is provided with a dependent arm 23 to which is attached a retracting spring 24. The spring 24 not only retracts the pawl 20 preparatory to the next advancement of the pin wheels by its engagement with the ratchet wheel during its forward movement, but also tends to maintain the nose of the pawl depressed into engagement with the ratchet wheel. The pawl is actuated by movement of the record card holder as hereafter described.

Also mounted on the pin wheel shaft 17 beside the ratchet wheel 19, is a sprocket wheel 25 connected by a chain belt 26 with a larger sprocket 27 upon the shaft 28 of a carbon retrieving roller 29, extending across the compartment 11 forwardly of the pin wheels 16. The arrangement is such that during each advancement of the record strip 14 by a partial rotation of the pin wheels 16 under influence of the actuating pawl 19, the roller 29 is differentially advanced a lesser distance to present a fresh surface of the transfer strip 15 at the writing position.

Slidingly mounted upon the marginal track beads 7 of the guide surface 6 is a reciprocatory record card holder comprising an open rectangular frame 30 resting upon the marginal beads 7 of the guide top 6, and having dependent flanges 31 at opposite sides of the guide 6 extending into overlapping relation with the opposite side walls 5 of the interior frame.

Carried by the reciprocatory frame 30 and projecting laterally through a slot 32 in the side wall of the cabinet is a flat tubular guide extension 33 or vestibule having a flaring entrance 34. The guide extension 33 is divided by a horizontal wall 35 thus providing two guide passages through which a pair of record cards 36 are inserted into record receiving position. The carriage frame 30 is provided with stops 37 carried by corner brackets 37', which limit the insertion of the cards and locate them in proper relation with the holder and in overlying relation with the strip 14.

In order to produce triplicate records, one on the record strip 14, another on the under card 36, and the original record upon the topmost card 36, two strips 15 of carbon material are necessary. In order that the cards may be inserted, one between the carbon strips and the other overlying the carbon strips, without interference with the edges of the carbon or record strips, short flaps 38 of fabric or other thin material are attached to the division wall of the guide extension 33 of the card carriage, and extend thence into overlapping relation with the respective carbon strip. If desired, the margins of the respective walls of the card holder vestibule or extension may be extended beyond the margins of the strips.

As shown in detail view, Fig. 8, the margin of the card holder overlies the lower carbon strip 15 while double flaps 38 extending from the division wall of the card guide, extend above and below the upper carbon strip. The arrangement is such that the edge of the lower card passing between the lower flap and the margin of the card holder is safely guided past the edges of both the over and underlying carbon strips. The upper card passing over the uppermost flap is prevented from engaging the edge of the upper carbon strip.

For the usual methods of installment or partial payment recordings, or for stock keeping and the like, single entries are made on successive lines or in succeeding spaces on the cards. The cards having been inserted in the card holder in superposed relation, one above and the other below the division wall, and directed thence one above and the other between the transfer strips, the holder is slidingly shifted relative to the cabinet until the desired entry space is immediately beneath the opening 4 in the lid or cover. The entry is then made through such opening onto the uppermost record card 36.

The inscribed legend is transferred by the interleaved transfer or carbon material 15 onto the underlying card 36 and again transferred by the lowermost carbon strip on the record strip 14. A guard flange 39 attached to the side of the cabinet 1 overlaps the entrance guide to the card holder when the latter is in its retracted position. The position of the guard 39 is such that the cards may be inserted into and removed from the card holder only when the latter is in its advanced position beyond said guard 39.

In its advancement to card receiving and discharge position after completion of an entry, the reciprocatory carriage contacts the rear end of the actuating pawl 20 to advance the ratchet wheel and thereby the record strip 14 one space. Thus, after an entry has been made and transferred to the record strip, before the cards may be removed, the card carriage must necessarily be pushed forward to the limit of its range of movement. In so doing, the pawl is actuated to advance the strip 14 one line or space to present the next entry receiving area of the record strip in registry with the opening 4, preparatory to the next record entry.

It is obvious that but a single card may be used, or that more than two cards may be utilized, by providing additional transfer strips and bridging flaps overlapping their edges. Likewise, plural record strips 14 may be employed with an additional interleaved strip of carbon. As an alternative, a stratum of carbon material may be applied directly to the backs of the cards and additional strips.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. An autographic register, wherein records are made upon interchangeable record sheets and consecutively reproduced upon a continuous transfer strip, including a cabinet, a supply compartment therein for a packet of record strip material, a receiving compartment therein into which inscribed portions of the record strip are delivered, said cabinet having therein an opening defining an inscription receiving position through which entries may be made onto underlying record receiving material, a strip feeding device for intermittently advancing the record strip past the inscription receiving position and arresting it with succeeding record receiving areas in registry therewith, a reciprocatory holder for an interchangeable record sheet movable to and fro in superposed relation with the record strip to present a selected record receiving area thereof in the inscription receiving position in registry with the registered record receiving area of the record strip, actuating means for the strip feeding device operated by movement of the reciprocatory record sheet holder and detent means preventing interchange of record sheets until the strip feeding device has been operated.

2. An autographic register, including a cabinet having an opening therein through which record entries may be made on underlying record receiving material, a strip feeding device for advancing a continuous record strip through a step-by-step movement past said opening, and arresting the strip with succeeding record areas thereof in registry with said opening, a reciprocatory holder for an interchangeable record sheet movable relative to the opening independently of the strip to present a selected record receiving area thereof in registry with the opening, there being a stratum of transfer material interposed between the sheet and strip by which a record inscribed on one is reproduced on the other, and means for preventing interchange of the record sheet in the holder until the strip has been advanced to present a succeeding record receiving area therein in the inscription receiving position.

3. In an autographic register, wherein duplicate records are simultaneously made upon an interchangeable record sheet and a continuous record strip, a strip feeding device for advancing a continuous record strip through a step-by-step movement from a source of supply past a record making position and registering succeeding record receiving areas thereof with said position, an adjustable sheet holder for interchangeable record sheets adapted by its adjustment to present succeeding record receiving areas of the sheet in registry with the record making position, and means for actuating the strip feeding device by the movement of the sheet holder, preparatory to the entry of a succeeding record on the strip.

4. In an autographic register, having a restricted record entry space within which an entry may be made upon underlying record receiving material, a reciprocatory sheet carrier in which record receiving sheets may be interchangeably positioned, said sheet carrier being movable fore and aft of the register to present a preselected record receiving area thereof in registry with the record entry space, and an underlying record strip to which succeeding sheet entries are transferred.

5. In an autographic register for making duplicate records on interchangeable record sheets, a cabinet having a restricted opening through which records are made on underlying record material, mounting means for a stratum of transfer material coincident with the record making position, a traveling carrier into which superposed record sheets are removably inserted, guide means on the carrier extending into overlapping relation with the transfer material for guiding the inserted record sheets into record making relation with the transfer material without interference with the margin thereof.

6. In an autographic register, a cabinet having in its top a restricted opening through which entries may be made upon underlying record receiving material, a traveling holder for an interchangeable sheet of record material which by its travel motion presents different portions of the interchangeable record sheet in registry with the cabinet opening, a strip feeding device for advancing a continuous strip of record material past the opening in a direction transverse to the writing lines thereon and arresting succeeding record receiving areas thereof in registry with the opening, the interchangeable record sheet being movable longitudinally of the strip by movement of the traveling holder to present a selected area thereof simultaneously in registry with the said opening and with the area of said strip then in registry with the opening, there being a stratum of transfer material interposed between the record sheet and strip materials.

7. In an autographic register, strip feeding means for progressively advancing a continuous strip of material through a step-by-step movement past a record receiving position, an adjustable holder for an interchangeable sheet of record material presenting the interchangeable sheet of material in overlapping relation with the strip and movable to and fro in a path parallel to that of the strip to present a selected record receiving area thereof in registry with a particular record receiving area of the strip, there being a stratum of transfer material interposed between the sheet and strip.

8. In an autographic register, a cabinet including strip feeding means for progressively advancing a continuous strip of record material the combination with said cabinet of a traveling holder mounted therein for an interchangeable record sheet insertable in and removable from the holder, and means to compel the adjustment of the holder to a particular position in relation to the cabinet for insertion and removal of a record sheet, the strip feeding means being actuated by the adjustment of said holder.

9. An autographic register wherein a continuous strip of record material is advanced through a step by step movement, a traveling holder for receiving an independent interchangeable record sheet, and detent means preventing the insertion or removal of an independent record sheet into or from said holder constructed and arranged so as to release the detent means upon advancement of the continuous strip of record material by the adjustment of the holder.

10. In an autographic register for producing records on interchangeable sheets, the combination with a cabinet having an opening therein through which inscribed records may be made on underlying record material, a traveling record sheet holder mounted in the cabinet for fore and aft movement relative to the inscription opening, said holder including an open frame, record sheet locating means carried thereby defining the position of an inserted sheet relative to the holder, and a tubular guide entry through which interchangeable sheets may be inserted and removed.

11. In an autographic register, a writing position past which a record strip is progressively advanced, a strip feeding device for advancing the strip through a step-by-step movement, a reciprocatory carrier for interchangeable record sheets movable fore and aft past the writing position to present selected record receiving areas of a removable record sheet carried thereby in overlying relation with the record strip at the writing position, there being a stratum of transfer material intermediate the record strip and sheet, the construction and arrangement being such that record legends inscribed in different areas of different interchangeable record sheets are reproduced in consecutive order upon the record strip.

12. An autographic register, wherein duplicate records are simultaneously produced upon an interchangeable record sheet and upon a continuous record strip, strip feeding means for advancing a continuous record strip through a step-by-step movement and presenting succeeding record receiving areas thereof in registry with a recording position, a record sheet holder for interchangeable sheets adjustable independently of the strip in a direction parallel to the path of travel thereof to present a selected area of a sheet carried thereby in registry with a record receiving area of the record strip, there being a stratum of transfer material between the sheet and strip.

13. An autographic register, wherein duplicate records are simultaneously produced upon an interchangeable record sheet and upon a continuous record strip, including a strip feeding device, a reciprocatory holder for interchangeable record sheets movable to and fro to present a selected area of a record sheet carried thereby in record receiving position, and means preventing the interchange of record sheets in the holder until the strip feeding device has been operated to advance the strip to present a record receiving area thereof in record receiving position.

14. A recording apparatus wherein there are produced in sequence upon a common record sheet duplicate entries of indicia entered in different positions on each of several interchangeable record sheets, including a support for the common record sheet and a support for a selected one of the interchangeable record sheets, arranged to present the respective record sheets in superposed relation, said supports being relatively adjustable to enable the succeeding sequential record receiving space of the common record sheet and an optionally selected record receiving space of the selected interchangeable record sheet to be simultaneously presented in registry with each other in record receiving position, and a feeding device actuated by the relative adjustments of the respective record sheet supports for automatically advancing the common record sheet to effect the presentation of the succeeding sequential record receiving space of the common record sheet in record receiving position.

15. The herein method of producing in sequence upon a common record sheet duplicate entries of indicia entered in different positions on each of several interchangeable record sheets including superposing the respective record sheets one upon the other, slidingly adjusting the sheets one relative to the other to present a selected record space of the plurality thereof upon the interchangeable record sheet in registry with the succeeding sequential record receiving space of the common record sheet simultaneously in record receiving position, and utilizing the relative sliding motion of the selected interchangeable record sheet relative to the common record sheet to effect the automatic advancement of the succeeding record receiving space of the common record sheet into position for registry with the selected record space of the interchangeable record sheet.

16. The herein method of producing in sequence upon a common record sheet duplicate entries of indicia entered in different positions on each of several interchangeable record sheets including superposing the respective record sheets one upon the other, slidingly adjusting the interchangeable record sheets relative to the common record sheet to present the selected record receiving space of the plurality thereon in registry with the succeeding sequential record receiving space of the common record sheet and automatically advancing the common record sheet through succeeding step-by-step movements to present succeeding record receiving spaces thereof in record receiving position incidental to the interchange of the interchangeable record sheets.

17. In a recording apparatus for producing upon a common record sheet consecutive entries of indicia entered in different positions on each of several interchangeable record sheets, including a support for the common record sheet, means for progressively advancing the common record sheet through succeeding step-by-step movements to present successive record receiving spaces thereof in record receiving position, a reciprocatory carrier for the interchangeable record sheets movable to and fro in parallel relation with the path of the common record sheet to present a selected record receiving space of the plurality of interchangeable record sheets in registry with the succeeding record receiving space of the common record sheet in record receiving position, and interengaging means between the reciprocatory carrier for the interchangeable record sheet and the feeding device for the common record sheet necessitating the operation of one to enable the operation of the other.

18. A recording apparatus for producing upon a common record sheet consecutive entries of indicia entered in any one of a plurality of entry spaces upon an individual record sheet of an interchangeable plurality thereof, including relatively movable supports for the respective record sheets, by adjustment of which one relative to the other a selected record receiving space upon said one of a plurality of interchangeable record sheets is presented in registry with the record receiving space upon the common record sheet following the preceding entry thereon, a feeding device for advancing the common record sheet to present successive record receiving spaces thereof in record receiving position and an intercontrol means between the relatively movable supports for the record sheet so constructed and arranged as to prevent the operation of one of said members until the other has been first operated.

KENNETH P. MORSE.